United States Patent [19]
Peters et al.

[11] Patent Number: 5,861,800
[45] Date of Patent: Jan. 19, 1999

[54] IGNITION INTERLOCK AND PRNDL INDICATOR POWERING SWITCH

[75] Inventors: Roy A. Peters, Almont; Richard A. Tabor, Sterling Heights, both of Mich.

[73] Assignee: Chrysler Corporation, Auburn Hills, Mich.

[21] Appl. No.: 662,827

[22] Filed: Jun. 12, 1996

[51] Int. Cl.$^6$ .................................................. B60Q 1/00
[52] U.S. Cl. ............................................. 340/456; 70/252
[58] Field of Search ..................................... 340/456, 457, 340/430, 439; 180/337; 70/254, 252

[56] References Cited

U.S. PATENT DOCUMENTS

| | | | |
|---|---|---|---|
| 4,380,752 | 4/1983 | Reynolds | 340/456 |
| 4,942,937 | 7/1990 | Amberger et al. | 180/271 |
| 4,959,982 | 10/1990 | Mauz et al. | 70/252 |
| 4,972,692 | 11/1990 | Morikawa et al. | 70/252 |
| 5,003,799 | 4/1991 | Imai et al. | 70/247 |
| 5,009,295 | 4/1991 | Kinkade et al. | 192/4 A |
| 5,014,038 | 5/1991 | Leigh-Monstevens et al. | 340/456 |
| 5,021,764 | 6/1991 | Mabee | 340/456 |
| 5,027,931 | 7/1991 | Ratke et al. | 192/9 |
| 5,078,242 | 1/1992 | Ratke et al. | 192/4 A |
| 5,096,033 | 3/1992 | Osborn | 192/4 A |
| 5,129,494 | 7/1992 | Rolinski et al. | 192/4 A |
| 5,150,593 | 9/1992 | Kobayashi et al. | 70/248 |
| 5,181,592 | 1/1993 | Pattock | 192/4 A |
| 5,218,847 | 6/1993 | Dieden et al. | 70/247 |
| 5,226,303 | 7/1993 | Dieden et al. | 70/247 |
| 5,251,723 | 10/1993 | Rolinski et al. | 192/4 A |
| 5,289,907 | 3/1994 | Pattock | 192/4 A |
| 5,309,744 | 5/1994 | Kito et al. | 70/247 |
| 5,421,792 | 6/1995 | Kataumi et al. | 477/99 |
| 5,445,575 | 8/1995 | Sundeen | 477/99 |
| 5,489,246 | 2/1996 | Moody et al. | 477/96 |
| 5,490,585 | 2/1996 | Togano | 192/4 A |

*Primary Examiner*—Jeffery A. Hofsass
*Assistant Examiner*—John Tweel, Jr.
*Attorney, Agent, or Firm*—Roland A. Fuller, III

[57] ABSTRACT

An ignition interlock with PRNDL powering switch has a mechanism for locking a lock slider in position for prohibiting movement of a gear selector. The mechanism includes a plate for locking the slider in position and a cable for connecting with the gear selector. A sensor is associated with the mechanism and a PRNDL indicator. The sensor senses the position of the lock slider such that upon activation of the sensor, power is applied to the PRNDL indicator, causing a display within the PRNDL indicator to illuminate.

10 Claims, 2 Drawing Sheets

IGNITION INTERLOCK AND PRNDL INDICATOR POWERING SWITCH

FIELD OF THE INVENTION

The present invention relates to automotive vehicles and, more particularly, to an ignition interlock with a PRNDL powering switch.

Motor vehicles having automatic transmissions include an indicator which provides the driver with a visual indication of the vehicle's transmission mode. This indicator is known in the art as a PRNDL (Park, Reverse, Neutral, Drive and Low). Ordinarily, the PRNDL indicator is adjacent or attached to the gear selector mechanism such that a pointer or the like is mechanically coupled to the gear selector so that as the gear selector is moved, the pointer moves to the proper letter of the PRNDL indicator.

In vehicles which have an electronic PRNDL, a sensor is present which senses the position of the gear selector and transmits a signal which illuminates the proper mode letter on the PRNDL indicator when the gear selector is moved into the desired mode. Federal regulations require that electronic PRNDL's are powered or illuminated before the driver can move the gear selector or shifter from the park position. Thus, electric PRNDL must be illuminated so the driver can see what mode the transmission is in at starting of the vehicle or immediately thereafter but ordinarily prior to or during the unlocking of the ignition switch, when the switch is turned to start the vehicle.

Electronic PRNDL powering systems have been associated with keys entering into the vehicle ignition switch. Here, upon the key passing into the ignition switch, the key is sensed and a signal is transmitted to illuminate the PRNDL indicator. However, these systems have a drawback since the sensing device requires power, which power is drawn from the vehicle battery. If the keys are left in the vehicle ignition switch for a prolonged period of time, the sensor will drain the battery, thus prohibiting the driver from starting the vehicle.

SUMMARY OF THE INVENTION

It is an object of the present invention to overcome the disadvantages of current art devices. The present invention provides an active system which is activated upon movement of the ignition interlock locking slide from a locking to a use position. The present invention provides an ignition interlock with a PRNDL powering switch which is effective and inexpensive to manufacture.

From the following detailed description taken in conjunction with the accompanying claims and drawings, other advantages will become apparent to those skilled in the art.

DETAILED DESCRIPTION OF THE PREFERRED EMBODIMENT

Figure 1:
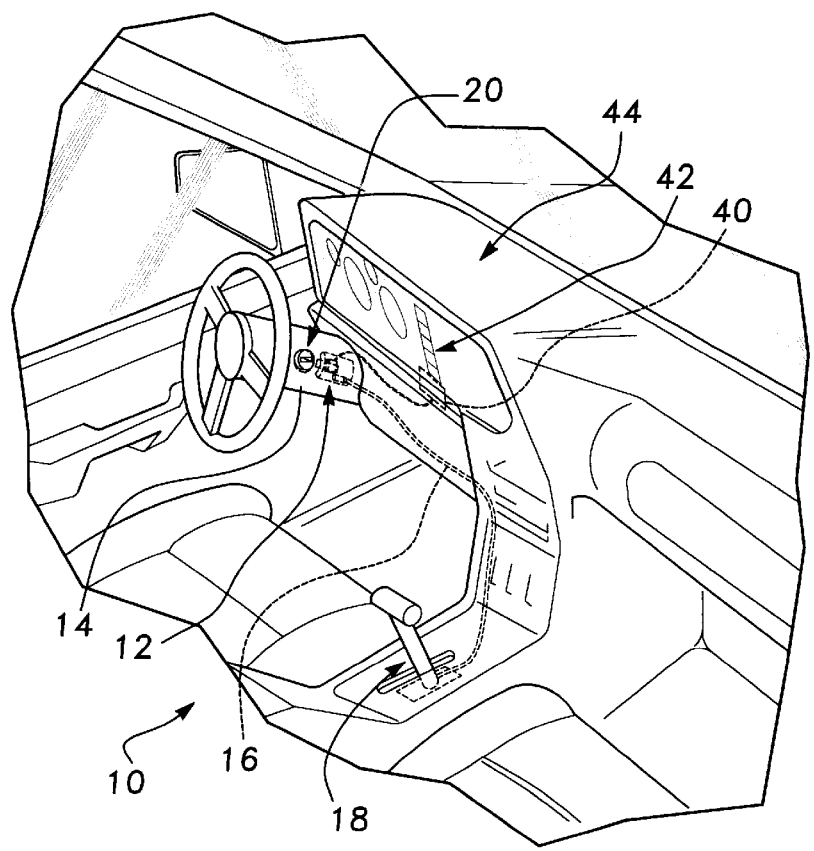
FIG. 1 is a perspective view of a vehicle cockpit illustrating a dashboard, steering column, and gear selector.

Turning to FIG. 1, a vehicle cockpit is illustrated and designated with the reference numeral 10. An ignition interlock system 12 is coupled to the steering column 14. The ignition interlock system includes a cable 16 which is coupled with the gear selector 18. Also, the ignition interlock is associated with the ignition switch 20 which is likewise mounted on the steering column 14.

Figure 2:
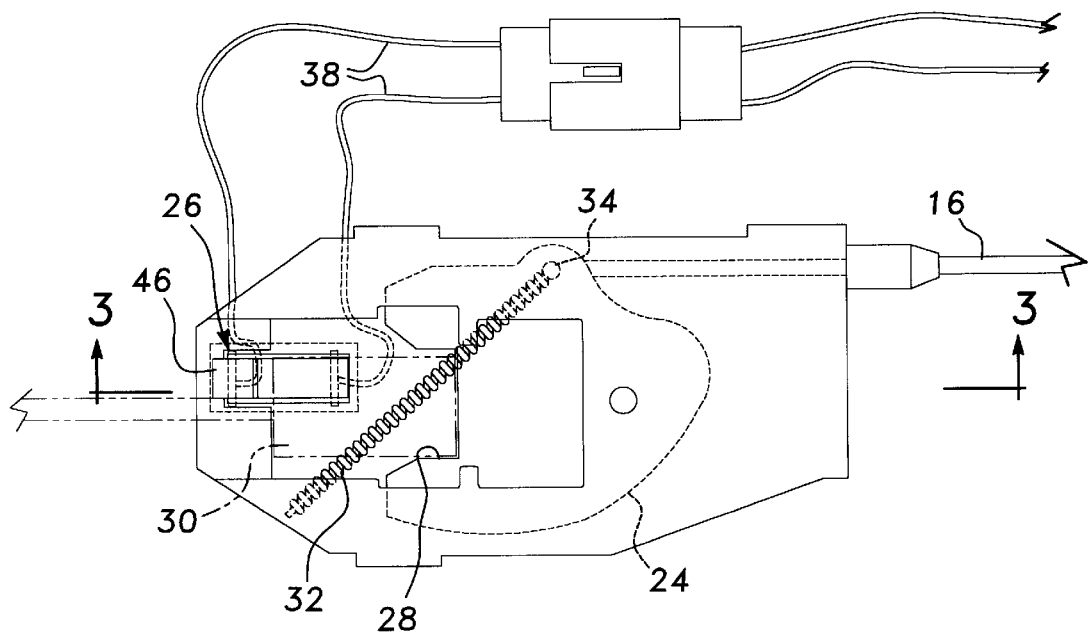
FIG. 2 is a plan view partially broken away of the ignition interlock in accordance with the present invention.

The ignition interlock 12 includes a housing 22 with a pivot locking plate 24 and a sensor 26. The housing 22 is secured to the steering column 14 by conventional means. The locking plate 24 includes a cut-out or recess 28 which receives the ignition lock slider 30. When the vehicle ignition 20 is in a locked position, the lock slider 30 is positioned within the recess 28 of the locking plate 24 as seen in phantom in FIG. 2. Thus, the gear selector 18 cannot be moved since the plate 24 is unable to move. Rotating the ignition switch 20 out of the locked position causes a mechanism (not shown) to move the lock slider 30 out of the recess 28, allowing the gear selector 18 to be moved into the desired gear mode. A spring 32 acts with the cable connection 34 to move the plate to its indicated position.

Figure 3:
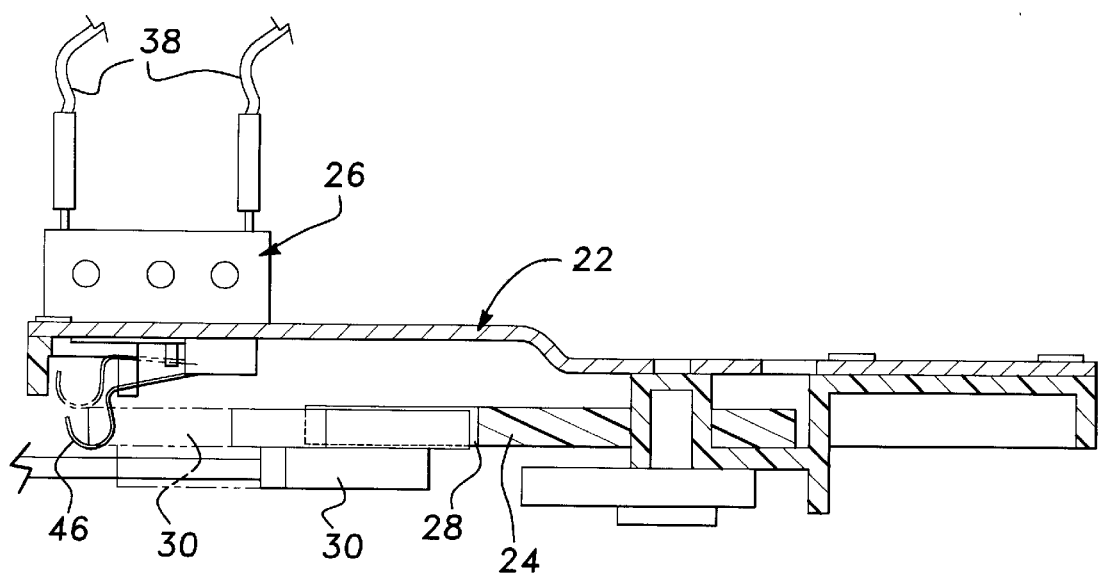
FIG. 3 is a cross-section view of FIG. 2 along line 3—3 thereof.

The sensor 26 may be any type of electronic or mechanical sensor. The particular sensor is a micro limit switch having electrical leads 38 leading to circuitry 40 which is coupled with the PRNDL indicator 42 in the dashboard 44. The sensor 26 mechanically senses the movement of the lock slider 30 such that as the lock slider 30 is moved out of the cable interlock plate recess 28, the switch 26 is activated which, in turn, powers the PRNDL indicator, allowing the PRNDL indicator to display the current gear mode. As seen in FIG. 3, the switch 26 includes a cantilevered arm 46 which is contacted by the slider 30 as it moves from a locked to an unlocked position. Thus, upon sensing the lock slider 30 passing the sensor 26, the PRNDL indicator is powered, causing the appropriate display within the PRNDL indicator to illuminate. Accordingly, since the lock slider 30 activates the sensor 26 prior to starting the vehicle, under the Federal Regulations, illumination occurs prior to the starting of the vehicle.

In operation, a key is inserted into the ignition switch 20. The ignition switch 20 is rotated from its locked to an unlocked to a start position. As the ignition is turned from the locked to the unlocked position, the slider 30 is moved from inside the plate recess 28 and is sensed by the switch 26 as it moves out of the recess. As this occurs, a signal is sent to the circuitry 40 which, in turn, powers the PRNDL indicator, causing a display within the PRNDL indicator to illuminate 42. These steps happen very rapidly so that prior to the driver turning the ignition switch into the start position, the display within the PRNDL indicator is illuminated prior to starting of the vehicle. Thus, the vehicle would be in accordance with the desired guidelines. Also, as the slider 30 moves out of the plate recess 28, the gear selector 18 can then be moved into the desired gear.

While the above detailed description describes the preferred embodiment of the present invention, the invention is susceptible to modification, variation and alteration without deviating from the scope and fair meaning of the subjoined claims.

What is claimed is:

1. An ignition interlock and PRNDL powering switch comprising:

a mechanism for locking a lock slider in position for prohibiting movement of a shifter mechanism, said mechanism including a first member for locking the lock slider in position and a cable for connecting the first member with the gear shifter further comprising: said lock slider slidably engaging said first member for preventing said cable from moving so as to lock said gear shifter into a predetermined position, said lock slider being movable relative to said first member in response to movement of an ignition switch; and a sensor associated with said mechanism and an electronic PRNDL indicator, said sensor sensing the relative position of said lock slider such that upon activation of said sensor power is applied to illuminate the PRNDL indicator.

2. The ignition interlock and PRNDL powering switch according to claim 1, wherein said sensor is a limit switch.

3. The ignition interlock and PRNDL powering switch according to claim 1, wherein said sensor is coupled with circuit means for illuminating the PRNDL indicator.

4. The ignition interlock and PRNDL powering switch according to claim 1, wherein said sensor mechanism contacts the lock slider.

5. The ignition interlock and PRNDL powering switch according to claim 1, wherein the lock slider moves in response to the movement of the ignition switch such that said sensor is activated before the ignition switch reaches a position used to start a vehicle.

6. A steering column in combination with an ignition interlock and a PRNDL powering switch comprising:

a column, an ignition switch coupled with said column, said ignition switch including a lock slider coupled with said column, said lock slider moving in response to movement of said ignition switch;

a mechanism for locking said lock slider in position for prohibiting movement of a shifter mechanism, said mechanism coupled with said column and including a first member for locking the lock slider in position and a cable for connecting the said first member with the gear shifter mechanism and said lock slider slidably engages said first member to prevent said cable from moving so as to lock said shifter mechanism into a predetermined position, said lock slider movable relative to said first member in response to said movement of said ignition switch; and a sensor associated with said mechanism and an electronic PRNDL indicator, said sensor sensing the relation position of the lock slider such that upon activation of said sensor, power is applied to illuminate said PRNDL indicator.

7. The steering column according to claim 6, wherein said sensor is a limit switch.

8. The steering column according to claim 6, wherein said sensor is coupled with circuit means for illuminating the PRNDL indicator.

9. The steering column according to claim 6, wherein said sensor mechanism contacts the lock slider.

10. The steering column according to claim 6, wherein the lock slider moves in response to movement of the ignition switch such that the sensor is activated before the ignition switch reaches an unlock position.

* * * * *